Figure 1:
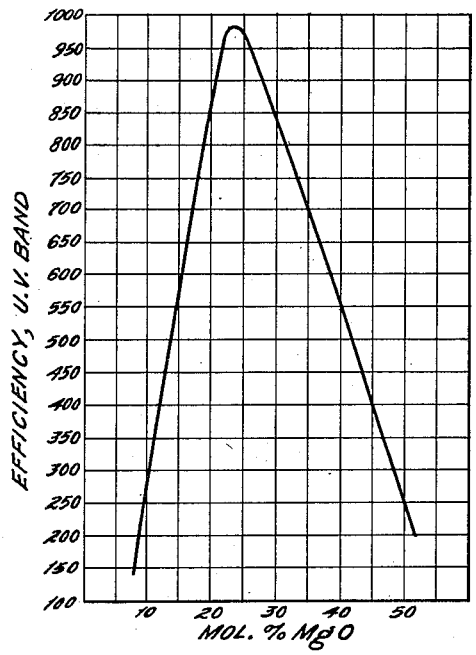

Feb. 10, 1953

A. L. J. SMITH 2,628,201

ZINC-MAGNESIUM OXIDE LUMINESCENT MATERIALS
AND METHODS OF MAKING SAME

Filed July 29, 1949

Inventor

Arthur L. J. Smith

By Morris A. Kahn

Attorney

Patented Feb. 10, 1953

2,628,201

UNITED STATES PATENT OFFICE 2,628,201

ZINC-MAGNESIUM OXIDE LUMINESCENT MATERIALS AND METHODS OF MAKING SAME

Arthur L. J. Smith, Lancaster, Pa., assignor to Radio Corporation of America, a corporation of Delaware Application July 29, 1949, Serial No. 107,616

11 Claims. (Cl. 252—301.6)

This invention relates to improvements in luminescent materials which are also commonly known as phosphors.

Several different types of phosphors have previously been found useful for incorporating in the viewing screens of cathode ray tubes. The particular type of phosphor which should be used in any one tube, for optimum results, depends upon the particular use to which the tube is to be put. For some applications, it is desirable to have a phosphor providing substantially white luminescence. For other applications, the color of visible light output makes little difference but the decay period (period of time in which luminescence drops to a negligible value after excitation ceases) is of prime importance. Still other applications require phosphors which have peak output of a particular wavelength and also very short decay time. An example of the latter type of application is in so-called flying spot scanners.

In apparatus using a flying spot scanning system, a focused beam of electrons is used to cause a luminous spot to appear on the screen of a cathode ray tube. Horizontal and vertical sweep circuits may be used to sweep the luminous spot across the tube screen in accordance with some desired pattern. The moving spot may then be used to scan an object such as a photographic negative which varies in opacity from point to point. That portion of the light from the spot which passes through the negative may then be focused on the light sensitive electrode of a photoelectric device. The photoelectric device, with suitable amplifiers in its output circuit, converts the light signal into an electrical signal.

The above described method is part of a well known process of transmitting pictures either by wireless or by wire and is but one illustrative example of many different processes which may utilize a flying spot scanning system.

At present, the type of photoelectric device which is preferable for use in a system utilizing flying spot scanning is a tube known as a photomultiplier. This tube is prefererd because of its many advantages such as high gain and relatively high sensitivity.

In preferred types of photomultiplier tubes, such as either the RCA type 931–A or type 1P21, the light-sensitive electrode is not uniformly sensitive to light of all wavelengths but has a peak sensitivity to light of 4000 A. This tube also may be said to have a maximum sensitivity to wave energy within the range of about 3500 Å to about 4500 Å. Response falls off rapidly on either side of this range. Another type of photomultiplier tube, the RCA 1P22 has a peak sensitivity at 4200 Å. and a maximum sensitivity range of about 3700 to about 4700 Å.

It will be evident that, in any flying spot system, it is desirable to have a phosphor screen which will have a peak output of luminescence as close as possible to the range of maximum sensitivity of the photomultiplier tube which is to be used.

Heretofore, because of its high efficiency and short decay period, zinc oxide has been the phosphor most commonly used in the screens of cathode ray tubes used in flying spot scanning systems. However, the peak emission of this phosphor is at 5050 Å., which is a considerable distance from the wavelength range of maximum sensitivity of any of the three preferred types of photomultiplier tubes mentioned above.

The present invention is an improved phosphor material which has all of the desirable properties of the zinc oxide phosphors but has peak emission which may be shifted to about 4800 Å., if desired. Another desirable property of the improved phosphors of the present invention is their relatively high efficiency of output in the ultra-violet region of the spectrum.

The new phosphors of the present invention are prepared by firing magnesium oxide with luminescent zinc oxide. Magnesium oxide, itself, has no luminescent properties. However, it has been found that the efficiency of output of zinc oxide in the ultra-violet region can be increased to a considerable extent by adding increasing amounts of magnesium oxide and also that the wavelength of peak emission of luminescent zinc oxide can be shifted to a marked extent by adding increasing amounts of magnesium oxide.

One object of the present invention is to prepare improved phosphors having relatively high efficiency of output in the ultra-violet region of the spectrum.

Another object of the present invention is to provide improved phosphors with peak emission below 5000 Å.

Another object of the present invention is to provide improved phosphors having a relatively short decay period.

Another object of the present invention is to provide improved phosphors having a very short period of time lag between excitation and maximum emission.

Still another object of the present invention is to provide a method of shifting the wavelength of peak luminescence output of luminescent zinc oxide.

Figure 2:
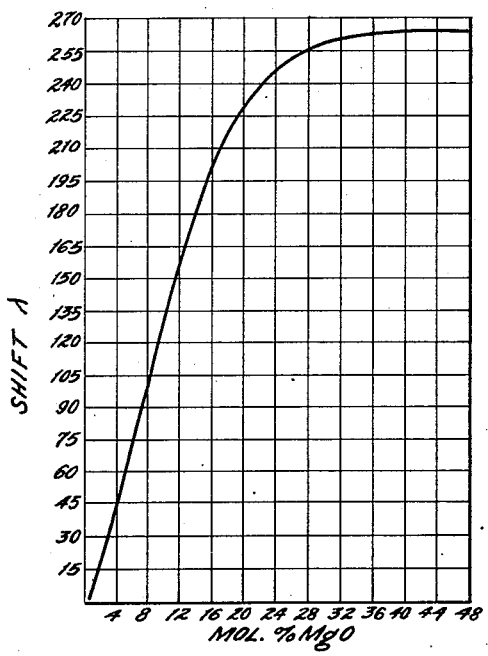

These and other objects will be more apparent and the invention will be more readily understood from the following description, including the drawings, of which, Fig. 1 is a graph of ultra-violet output efficiency vs. mol percent magnesium oxide in a ZnO-MgO phosphor of the present invention, and Fig. 2 is a graph of shift in wavelength ($\lambda$) vs. mol percent magnesium oxide in a ZnO-MgO phosphor of the present invention.

The improved phosphors of the present invention may be prepared by methods which are similar to any of those disclosed in co-pending application of Arthur L. J. Smith, Serial No. 29,577, filed May 27, 1948, now Patent No. 2,529,711 issued November 14, 1950. The said co-pending application discloses methods of preparation of zinc oxide phosphors. If the proper amounts of magnesium oxide are mixed with the zinc oxide used to prepare the materials of the said co-pending application, the luminescent materials of the present invention will be produced. As disclosed in the said co-pending application, it has been found that luminescent zinc oxide phosphor having good characteristics can be prepared by firing the zinc oxide in a reducing atmosphere of hydrogen, ammonia, or carbon monoxide or other reducing medium until an excess of zinc has been formed; removing the excess zinc by oxidation or volatilization; and then permitting the residual zinc to diffuse throughout the individual crystals. It is not clear just what the function of this zinc metal is, yet it is thought to be an activator. Zinc oxide phosphor has only been produced successfully by firing the material in the presence of zinc metal. Specific examples of preparation of the improved phosphors of the present invention will now be given.

*Example I*

With a quantity of chemically pure zinc oxide prepared by a dry process, there is mixed 20 mol percent magnesium oxide such that the total weight of the mixture is about 35-40 g.

In this and in all other examples, it will be assumed that the total mixture is 100 mol percent. Thus, a mixture containing 20 mol percent magnesium oxide would also contain 80 mol percent zinc oxide. Mixing may be done by dry jar rolling for 24 hours. The mixture is placed in a quartz or porcelain boat and inserted in a quartz tube. A stream of carbon monoxide or hydrogen is passed through the cold tube for about 10 minutes, after which the tube is placed in a furnace and fired at a temperature of between 940° C. and 1000° C. for 10-60 minutes in a reducing atmosphere of carbon monoxide. The first firing step is followed by a second firing step, which takes place at a temperature of between 940° C. and 1000° C., for from 10 to 60 minutes in a mildly oxidizing atmosphere, which may be nitrogen containing from about 0.01 percent to about 0.3 percent oxygen. Alternatively, this firing step may take place in an atmosphere of an inert gas containing no oxygen. The thus prepared phosphor is then cooled in the same mildly oxidizing atmosphere or in the inert atmosphere containing no oxygen.

The time of first firing in the carbon monoxide atmosphere is not very critical. Times longer than 60 minutes may be used, although this uses up some of the material and produces less efficient phosphors.

The firing temperature may also be varied beyond the preferred range of 940° C. to 1000° C. Temperatures, however, must be above 907° C., which is the boiling point of zinc, and should not be greater than about 1300° C.

For the first firing step in the reducing atmosphere, other reducing gases, such as hydrogen or ammonia, may be used. Inasmuch as hydrogen has a stronger reducing action than carbon monoxide, the firing time should be about 5 to 20 minutes when using an atmosphere of hydrogen.

It has also been found that the ultra-violet emission of the phosphor may be increased by a third firing step. After firing in the mildly oxidizing atmosphere, the material may be fired in a neutral atmosphere, of nitrogen, for example, at a temperature of 907° C. to 1300° C. and, preferably, from 940° C. to 1000° C. for at least 15 minutes.

A further variation in the process of preparation may be made by first firing the mixture of zinc oxide and magnesium oxide in a reducing atmosphere of carbon monoxide for from 10 to 60 minutes, or in an atmosphere of hydrogen for 10 to 15 minutes, at 970° C. to 1000° C. This is then followed by a second firing step which takes place in a neutral atmosphere of, for example, nitrogen for about 10 to about 60 minutes, preferably, at 970° C. to 1000° C. The product is then cooled in a nitrogen atmosphere. The second firing time may be much longer than 60 minutes but a longer firing period is unnecessary and wasteful.

The second firing step in a neutral atmosphere may be omitted if the material is cooled in an atmosphere of pure carbon monoxide or pure nitrogen immediately after the first firing in the atmosphere of carbon monoxide (that is, a non-oxidizing atmosphere).

Another modification in the preparation of the materials of the present invention, which may be applied to any of the above processes, is to bring the mixture of zinc and magnesium oxides up to firing temperature, using an atmosphere of pure nitrogen. This may occupy a time period of about 15 to 20 minutes, but may be longer with no change in the characteristics of the final product.

The products formed by the above described processes have been subjected to X-ray diffraction studies. The results of these studies indicate that only a limited amount of magnesium oxide can be incorporated in the crystal lattice of the zinc oxide as a solid solution. The amount of magnesium oxide which can be thus incorporated has been found to be not more than about 25 mol percent. Also, only negligible effects are produced if the amount of magnesium oxide introduced is less than about 1 mol percent.

Fig. 1 shows how the ultra-violet efficiency of a zinc oxide phosphor is affected by adding gradually increasing amounts of magnesium oxide up to about 50 percent in accordance with the present invention. As shown in the figure, ultra-violet efficiency rises rapidly and is at a peak value when about 25 mol percent of magnesium oxide is used. Beyond 25 mol percent, efficiency drops, although it is still somewhat better than that of zinc oxide, alone, when 50 mol percent magnesium oxide is used. The ultra-violet output was measured, using cathode rays accelerated by a potential of 8 kv. and using a current of 1.5 $\mu$a. A defocused spot was used.

Shift in the wavelength of peak emission of the phosphor with increasing amounts of magnesium oxide added to a zinc oxide phosphor material is shown in Fig. 2. As illustrated in the figure, the peak wavelength is shifted by increasing amounts as more and more magnesium oxide is added up to a maximum of about 30 mol per cent. The maximum shift obtainable is nearly 270 Å. As previously indicated, this is of importance when selecting a phosphor to be used for flying spot scanning applications. Thus, if the zinc oxide to which the magnesium oxide is added has a peak emission at 5050 Å., this peak may be shifted to as low a wavelength as 4800 Å., depending upon the amount of magnesium oxide added.

Further measurements made on the phosphors of the present invention have shown that these materials have very short decay periods which are about the same as those of zinc oxide phosphors. These phosphors also show desirably short periods of attaining maximum luminescence output after excitation.

I claim as my invention:

1. A luminescent material as prepared by a process comprising preparing a mixture of zinc oxide and magnesium oxide in which the proportion by weight of said magnesium oxide is 1-50 mol per cent, firing the mixture at a temperature of 907° C. to 1300° C. in a reducing atmosphere, and then immediately cooling the material in a non-oxidizing atmosphere.

2. A material according to claim 1 in which the amount of said magnesium oxide is from 1 to about 25 mol percent.

3. A material according to claim 1 in which the proportion of said magnesium oxide is 1-30 mol per cent.

4. A method of preparing a phosphor material comprising preparing a mixture of zinc oxide and magnesium oxide in which the proportion by weight of said magnesium oxide is 1-50 mol per cent, firing the mixture at a temperature of 907° C. to 1300° C. in a reducing atmosphere, then firing said mixture in an atmosphere of an inert gas containing 0 percent to 0.3 percent oxygen at a temperature of 907° C. to 1300° C., and then cooling the product in an atmosphere of an inert gas containing 0 percent to 0.3 percent oxygen.

5. A method of preparing a zinc-magnesium oxide phosphor material comprising preparing a mixture of zinc oxide and magnesium oxide in which the proportion by weight of said magnesium oxide is 1-50 mol per cent, firing said mixture at a temperature of from 940° C. to 1000° C. in a reducing atmosphere of carbon monoxide for at least 10 minutes, then firing the material in an atmosphere of an inert gas containing 0 percent to 0.3 percent of oxygen at a temperature of from 940° C. to 1000° C. for at least 10 minutes, and then cooling the material in said last mentioned atmosphere.

6. A method of preparing a zinc-magnesium oxide phosphor comprising preparing a mixture of zinc oxide and magnesium oxide in which the proportion by weight of said magnesium oxide is 1-50 mol per cent, firing the mixture in an atmosphere of hydrogen at 940° C. to 1000° C. for at least 5 minutes, then firing the material in an atmosphere of an inert gas containing 0 percent to 0.3 percent oxygen at a temperature of 940° C. to 1000° C. for at least 10 minutes, and then cooling the material in said last mentioned atmosphere.

7. A method of preparing a zinc-magnesium oxide phosphor comprising preparing a mixture of zinc oxide and MgO in which the proportion by weight of said MgO is 1-50 mol per cent, firing said mixture in a reducing atmosphere at a temperature of 940° C. to 1000° C. for 10 to 60 minutes, then firing the material in a neutral atmosphere for at least 10 minutes at a temperature of from 940° C. to 1000° C., and then cooling the material in a neutral atmosphere.

8. A method according to claim 7 in which said reducing atmosphere consists essentially of carbon monoxide.

9. A method according to claim 8 in which said reducing atmosphere consists essentially of hydrogen.

10. A method of preparing a zinc-magnesium oxide phosphor comprising preparing a mixture of zinc oxide and MgO in which the proportion by weight of said MgO is 1-50 mol per cent, firing said mixture in an atmosphere of carbon monoxide for from 10 to 60 minutes at a temperature of from 970° C. to 1000° C., and then cooling the material in a non-oxidizing atmosphere.

11. A method of preparing a luminescent material comprising preparing a mixture of zinc oxide and magnesium oxide in which the proportion by weight of said magnesium oxide is 1-50 mol per cent, firing the mixture at a temperature of 907° C. to 1300 C. in a reducing atmosphere, and then immediately cooling the material in a non-oxidizing atmosphere.

ARTHUR L. J. SMITH.

REFERENCES CITED

The following references are of record in the file of this patent:

UNITED STATES PATENTS

| Number | Name | Date |
|---|---|---|
| 2,028,980 | Korinth | Jan. 28, 1936 |
| 2,481,344 | Reimert | Sept. 6, 1949 |
| 2,544,236 | Reimert | Mar. 6, 1951 |